Patented Sept. 24, 1935

2,015,180

UNITED STATES PATENT OFFICE 2,015,180

CONCENTRATION OF FORMALDEHYDE

Rudolph L. Hasche, Whitefish Bay, Wis., assignor to A. O. Smith Corporation, Milwaukee, Wis., a corporation of New York No Drawing. Application November 25, 1932, Serial No. 644,276

8 Claims. (Cl. 202—57)

The invention relates to the concentration of formaldehyde solutions and it is among the objects of the invention to provide an economical method of producing distillates composed of formaldehyde solutions having high concentration as compared to the liquor from which the distillate is evaporated.

Heretofore solutions of formaldehyde have been made by dissolving formaldehyde gas in a suitable solvent, such as water. The concentrations of the resulting solutions have been restricted as a practical matter to the concentrations of the formaldehyde in the gases which could be produced. A concentration of about 40% formaldehyde in water has been standardized as the commercial concentrated solution because solutions of about this strength result by dissolving in water the more concentrated gases which have been economically and commercially producible.

As far as I am aware, no economical method of distillation for making more concentrated solutions from less concentrated solutions of formaldehyde has been proposed. Gases carrying low concentrations of formaldehyde are available, and it is desirable to economically utilize these gases for producing standard commercial and other concentrated solutions.

The vapors from boiling water solutions of formaldehyde contain practically the same proportions of solvent and solute as the solution. Although it has been proposed to concentrate formaldehyde by refluxing, it is found that such extremely high reflux ratios are required that the proposal is impracticable. Other proposals have been made to extract a formaldehyde concentrate as a residuum from a vapor and liquid phase composition but as far as I am aware the method cannot be used successfully for concentrating weak solutions of formaldehyde. In water solutions formaldehyde forms polymers or hydrates which are non-volatile and tend to lower the vapor pressure of formaldehyde in the solution, and therefore give vapors and distillates of lower concentration than would be expected from an analysis of the solution.

In accordance with the invention, a soluble substance which does not combine with or produce polymers of formaldehyde, forms hydrates with the solvent, lowers the aqueous tension of the solution and decreases the solubility of the formaldehyde, is added to the formaldehyde-containing liquor which is to be concentrated. The solution is boiled and the vapors are condensed and collected. The formation of hydrates retains the solvent in the solution and in this way there occurs a salting out in which the volatility of the formaldehyde-solvent component, the boiling point of the mixture, and the depolymerization of the formaldehyde are increased.

The following particular embodiments of the invention illustrate the manner of putting the invention into effect but it is to be understood that various modifications can be made and the invention is not limited thereto.

Example I.—Anhydrous calcium chloride was slowly added to a water solution containing 12.6% formaldehyde by weight. The calcium chloride was added to give a neutral or slightly acid solution containing about 90 grams of calcium chloride and 8 grams of formaldehyde per 100 cc. of solution. In cases where the solution was alkaline to litmus after the calcium chloride was added, a sufficient amount of hydrochloric acid was added to acidify the solution or bring it to neutrality. It was found convenient to add a small amount of foam preventer, such as about 0.4 gram of sulphonated corn oil per 1000 cc. of solution. The solution was heated to boiling, about 120° to 150° C. and the vapors were condensed and collected in a container.

The first runnings of distillate of water-formaldehyde solution contained about 61% formaldehyde by weight. As the boiling was continued, the proportion of formaldehyde gradually decreased in the distillate and the water increased. The distillate was collected in a container until the mixed distillate contained the predetermined desired concentration of 35% to 45%. This distillate contained about 93% of the total formaldehyde of the original solution. The remainder of the formaldehyde was distilled and separately collected in a container to be concentrated in subsequent distillations or used for other purposes.

The final residue in the evaporator consisted of anhydrous or hydrated calcium chloride depending upon the extent of boiling. This residue was added to another batch of dilute formaldehyde solution and the foregoing procedure was repeated.

Example II.—A water solution containing 110 grams of calcium chloride per 100 cc. was slowly added to a water solution of formaldehyde containing 12.6% formaldehyde by weight until the mixed solution contained about 6 grams formaldehyde and 66 grams calcium chloride per 100 cc. A small amount of amyl alcohol was added to this liquor to prevent priming. The solution was boiled at temperatures between 110° and 130° C. and the vapors were condensed. The initial condensate contained about 32% formaldehyde by weight. A mixed distillate containing 25% formaldehyde was collected in a container and the remainder of the formaldehyde was collected as a more dilute solution in another container.

The solution containing 25% formaldehyde was mixed with the concentrated solution of calcium chloride which remained as a residue in the evaporator, and a repetition of the above described operation gave an initial distillate containing 50% formaldehyde and a mixed distillate containing 35% to 40% formaldehyde. The latter distillate contained about 85% of the formaldehyde in the original solution.

The largest recoveries of concentrated distillate and the most concentrated distillates are obtainable when larger proportions of the soluble non-volatile material are present as compared to the solvent. The proportion of the non-volatile material can be greater or less than that described in the illustrations depending upon the concentration desired in the distillate. Saturated solutions can be used. Various highly soluble non-volatile metal salts which can be combined with the solution to produce non-alkaline solutions and have the described function of calcium chloride can be used. The salts must be highly soluble in the solvent, raise the boiling point of the solution, and form hydrated salts so as to bring about the described effect of salting out. They must be salts which are practically inert to the solute in that they must not produce material amounts of decomposition products, non-volatile compounds or polymers of the solute. In the specification and claims, the term non-volatile soluble material refers to salts with the described properties. Magnesium chloride and zinc chloride are examples of non-volatile soluble materials but others can be used.

In concentrating formaldehyde it is desirable but not always necessary to slowly mix the non-volatile material and the formaldehyde solution to avoid the formation of small amounts of substances which produce foaming. Formaldehyde compounds are among the substances which produce foaming. They are deleterious in that they consume some of the formaldehyde and they accumulate in the non-volatile material and shorten the useful life thereof. However, from whatever cause foaming may result, it is desirable to add a small amount of a substance which has a higher boiling point than the solution and is insoluble therein, such as sulphonated corn oil, corn oil, paraffin oil or amyl alcohol to prevent foaming.

Since from the foregoing description it will be observed that various modifications of the invention can be made, no limitations are intended except those which are specifically recited in the annexed claims or are imposed by the prior art.

I claim:

1. The method of concentrating solutions of formaldehyde in water which comprises raising the boiling point of the solution to temperatures which will decompose the polymers therein by adding one of the materials of the group consisting of calcium chloride, magnesium chloride and zinc chloride, boiling to vaporize formaldehyde, condensing the vapor, and combining the first portions of condensate.

2. The method of concentrating solutions of formaldehyde in water which comprises adding calcium chloride to raise the boiling point of the solution to the decomposition temperature of the polymers therein, boiling to vaporize formaldehyde, condensing the vapors, and combining the first portions thereof separately from the solution.

3. The method of concentrating solutions of formaldehyde in water which comprises adding calcium chloride until the solution contains at least 60 grams of calcium chloride per 100 cubic centimeters of solution, boiling to vaporize formaldehyde, condensing the vapors, and combining the more concentrated portions of condensate separately from the solution.

4. The method of concentrating solutions of formaldehyde in water which comprises adding calcium chloride until the solution is saturated, boiling to vaporize formaldehyde, condensing the vapors, and combining the more concentrated portions of condensate.

5. The method of concentrating solutions of formaldehyde which comprises adding hydrous calcium chloride to the solution to raise the boiling point of the solution to the decomposition temperature of the polymers therein, boiling, to vaporize formaldehyde, condensing the vapors, collecting the more concentrated fractions of the condensate separately from the solution, and repeatedly mixing the condensate with said chloride and boiling until a condensate of predetermined concentration is produced.

6. The method of concentrating a formaldehyde solution which comprises adding to the solution a non-volatile soluble metal salt which is possessed of dehydrating properties and is substantially inert with respect to formaldehyde, but which decreases the vapor pressure of the solvent and the solubility of formaldehyde, in sufficient quantity to raise the boiling point of the solution to temperatures which will decompose the polymers contained in the solution and to salt out the formaldehyde, boiling to vaporize formaldehyde, condensing the vapor, and collecting the condensate.

7. The method of concentrating an aqueous solution of formaldehyde which comprises adding to the solution a non-volatile soluble metal salt which is possessed of dehydrating properties and is substantially inert with respect to formaldehyde, but which decreases the aqueous tension of the solution and the solubility of formaldehyde, in sufficient quantity to raise the boiling point of the solution to temperatures which will decompose the polymers contained therein, boiling to vaporize formaldehyde, condensing the vapor, and collecting the condensate.

8. The method of concentrating an aqueous solution of formaldehyde which comprises raising the boiling point of the solution to temperatures which will decompose the polymers therein by adding to the solution a material from the group consisting of calcium chloride, magnesium chloride, and zinc chloride, boiling to vaporize formaldehyde, condensing the vapor, and collecting the condensate which has a higher concentration of formaldeyhde than the solution to be concentrated, separately from the condensate which has a lower concentration of formaldehyde than the solution to be concentrated.

RUDOLPH L. HASCHE.